US006515768B1

(12) United States Patent
Deschuytere et al.

(10) Patent No.: US 6,515,768 B1
(45) Date of Patent: Feb. 4, 2003

(54) FREQUENCY MODULATION HALFSTONE SCREEN AND METHOD FOR MAKING THE SAME

(75) Inventors: Frank A. Deschuytere, Beveren (BE); Paul A. Delabastita, Antwerpen (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 08/938,945

(22) Filed: Sep. 18, 1997

Related U.S. Application Data

(63) Continuation of application No. 08/116,298, filed on Sep. 3, 1993, now abandoned.

(51) Int. Cl.[7] .......................... G06F 15/00; H04N 1/40; H04N 1/46
(52) U.S. Cl. .................... 358/3; 358/3.06; 358/3.19; 358/456; 358/458; 358/536
(58) Field of Search .................. 358/298, 456–459, 358/534–536, 500, 1.9, 3, 3.03, 3.06, 3.13, 3.19

(56) References Cited

U.S. PATENT DOCUMENTS

| | | | | |
|---|---|---|---|---|
| 4,673,971 A | * | 6/1987 | Ikuta et al. | 358/534 |
| 4,916,545 A | * | 4/1990 | Granger | 358/456 |
| 4,924,301 A | * | 5/1990 | Surbrook | 358/3.17 |
| 5,166,809 A | * | 11/1992 | Surbrook | 101/211 |
| 5,187,594 A | * | 2/1993 | Deutsch et al. | 358/459 |
| 5,276,535 A | * | 1/1994 | Levien | 358/458 |
| 5,716,755 A | * | 2/1998 | Rompuy | 358/480 |
| 5,740,279 A | * | 4/1998 | Wang et al. | 358/3.06 |
| 5,859,955 A | * | 1/1999 | Wang | 358/1.9 |
| 6,278,802 B1 | * | 8/2001 | Delabastita et al. | 358/1.2 |

* cited by examiner

*Primary Examiner*—Kimberly A. Williams
(74) *Attorney, Agent, or Firm*—John A. Merecki; Hoffman, Warnick & D'Alessandro

(57) ABSTRACT

A frequency-modulation halftone screen and method for making same, utilizing local randomization of a deterministic screen. The deterministic screen optimizes uniformity of the halftone dot distribution, while the local randomization suppresses artifacts due to subject moiré.

30 Claims, 3 Drawing Sheets

FREQUENCY MODULATION HALFSTONE SCREEN AND METHOD FOR MAKING THE SAME

This is a continuation of application Ser. No. 08/116,298 filed Sep. 3, 1993 now abandoned.

BACKGROUND OF THE INVENTION

Many reproduction methods are only capable of reproducing a small number of stable image tones. For example, offset printing is only capable of printing two stable tone values i.e. deposit ink or not. In order to reproduce images having continuous tones, a halftoning or screening technique is used. In the graphic arts environment, halftoning techniques convert density values of tints and images into a geometric distribution of binary dots that can be printed. The eye is not able to see the individual halftone dots, and only sees the corresponding "spatially integrated" density value. In a more general context, halftoning techniques can be seen as methods to convert "low spatial, high tonal resolution information" into an equivalent of "high spatial, low tonal resolution information". (The qualifiers "low" and "high" have to be seen on a relative scale in this context).

Two main classes of halftoning techniques have been described for use in the graphic arts field. These two techniques are known as "amplitude modulation" and "frequency modulation" screening. In amplitude modulation screening the halftone dots, that together give the impression of a particular tone, are arranged on a fixed geometric grid. By varying the size of the halftone dots, the different tones of images can be simulated. Consequently, his technique can also be called "dot-size modulation screening". In frequency modulation screening the distance between the halftone dots is modulated rather then their size, and can also be referred to as "dot-position modulation screening". This technique, although well known in the field of low resolution plain paper printers, has not obtained much attention for offset printing and other high end printing methods, probably because of the disadvantages to be discussed below.

Both classes of halftoning techniques are used in combination with a digital film recorder. A typical digital film recorder employs a scanning laser beam that exposes a photosensitive material at high resolution. The "grid" that defines the resolution at which the laser beam can be switched on or off, usually has an element size in the range of $1/1800$ of an inch. The photosensitive material can be a photographic film from which a printing plate is later prepared by means of photomechanical techniques. The smallest addressable unit on a recorder is often called a "micro dot", "recorder element", or "rel". Its size is referred to as the recorder "pitch". As illustrated in FIG. 1A and FIG. 1B a dot-size modulated halftone dot is made up of a clustered set of recorder elements, while frequency-modulation halftone dots constitute a dispersed set of individual recording elements.

The most important characteristics of a screening or haiftoning technique for faithfully reproducing continuous tone information include:

1) The image rendering characteristics, more specifically the capability of the technique to render spatial detail in the original image content without the introduction of artifacts such as moiré, textures and noise, as well as the capability to render a fill range of tones;
2) The photomechanical characteristics of the halftone dots produced by the method, which determine how consistently halftone dots can be recorded, copied or duplicated in the different steps of the photomechanical preparation of the printing plates; and,
3) The behavior of the halftones on an offset printing press.

The two classes of halftoning techniques, each with some of their variants, will now be reviewed in the light of the above characteristics, and their advantages and disadvantages will be discussed.

Amplitude Modulation Screening

Amplitude modulation screening has as its major advantages that it has excellent photomechanical reproduction characteristics, and that, for screens with rulings up to 200 dots/inch, it prints predictably on offset presses. An important disadvantage of amplitude modulation screening, however, is the fact that unwanted patterns can occur within the halftoned image. Depending on their origin, these patterns are called subject moiré, color moiré or internal moiré. Subject moiré results from the geometric interaction between periodic components in the original subject matter and the halftone screen itself. Methods addressing subject moiré are disclosed in e.g. U.S. Pat. No. 5,130,821, EP 369302 and EP 488324. These methods do not, however, completely solve the problem.

Color moiré results from interferences between the halftones of the different color separations of the image. The use of screen angles for the different color separations shifted by 60 degrees with respect to each other has been suggested to address this problem. Several disclosures relate to the problem of generating screens with these angles or close approximations thereof. See for example U.S. Pat. No. 4,419,690, U.S. Pat. No. 4,350,996, U.S. Pat. No. 4,924,301 and U.S. Pat. No. 5,155,599. Other combinations of angles, frequencies or relative phases of the halftone dot patterns for the different color separations have also been used to overcome the same problem, as described for example in U.S. Pat. No. 4,443,060, U.S. Pat. No. 4,537,470 and EP 501,126.

Internal moiré refers to patterns resulting from the geometric interaction of the halftone screen with the addressable grid on which they are rendered. Methods to reduce internal moiré are usually based on the introduction of a random element that breaks up or "diffuses" the phase error that periodically builds up as a consequence of the frequency and angle relation between the halftone screen and the addressable grid on which it is rendered. Examples of such techniques are disclosed in U.S. Pat. No. 4,456,924, U.S. Pat. No. 4,499,489, U.S. Pat. No. 4,700,235, U.S. Pat. No. 4,918,622, U.S. Pat. No. 5,150,428 and WO 90/04898.

Frequency Modulation Halftoning

None of the variants of the dot-size modulation screening has proven to be successful in completely eliminating the moiré problems, and frequency-modulation screening techniques have therefore been suggested to further reduce these problems. Such techniques usually produce aperiodic halftone dot distributions of which the Fourier spectrum is continuous. As is extensively discussed in the book by Ulichney Robert, "Digital Halftoning", MIT Press, Cambridge Mass., 1987, ISBN 0-262-21009-6, a relationship exists between the shape of this Fourier spectrum and the graininess of the tints corresponding to the dot distributions. If this spectrum contains energy below the cut-off frequency of the human visual system, the corresponding tint has an undesirable grainy appearance. It is hence the goal to use frequency-modulation halftoning methods that minimize this low-frequency energy. This goal has lead to the concept of "blue-noise halftoning", in analogy with the shape of the frequency spectrum of blue light, which also contains a reduced amount of energy at lower frequencies.

Various frequency-modulation halftone screening techniques have been disclosed and they can be divided into the following subclasses: (1) Error diffusion techniques (and their variations); (2) Point-to-point thresholding based techniques; and, (3) Special techniques, such as that disclosed in DE 29,31,092, and further developed in U.S. Pat. No. 4,485,397.

Perhaps the best known of all "frequency modulation" methods is the error diffusion algorithm. It comes in many variations, but the principle is always the same: the error that occurs as a result of the binarization (or, in a more general context, the quantization) of the image data during the rendering is "diffused" to one or more of the unprocessed pixels. Best known is the Floyd and Steinberg algorithm (Floyd, R. W., and L. Steinberg, "An Adaptive Algorithm for Spatial Greyscale", Proc. SID, vol. 17/2, pp. 75–77). Many variations exist, usually differing in the number of pixels to which the error is diffused and how the error diffusion weights are randomized. The error diffusion techniques are capable of producing high quality frequency-modulation halftones, but the calculation of the quantization error and the addition of its fractions to a number of pixels makes them inherently computationally more intensive than the dot-size modulation techniques based on a point-to-point thresholding operation.

A frequency-modulation halftoning technique that enables the same performance as the point-to-point thresholding screening is based on the use of the "Bayer" dither matrix (See Bayer, B. E., "An Optimum Method for Two-level Rendition of Continuous-tone Pictures", Proc. IEEE International Conference on Communications, Conference Record, pp. 26–11, 26–15, 1973). The Bayer dither matrix has a size that is a power of two, and contains threshold values that are arranged in such a fashion that, when thresholded against increasing levels of density, every halftone dot is "as far away as possible" from the halftone dots that are used to render the lower density levels. The size of the Bayer dither matrix is usually smaller than the size of the image that is to be halftoned, and this problem is overcome by replicating the matrix horizontally and vertically, like tiles on a floor, so that a threshold value is obtained for every image pixel.

The halftone dot patterns produced by the Bayer dither matrix contain strong periodic components, visible as "texture" that can potentially create moiré problems similar to the dot-size modulation algorithms. Because the energy of the periodic dither components is "spread" over the different harmonics, and because most of these harmonics have a relatively high frequency compared to the fundamental frequency of dot-size modulation, the moiré that occurs is less disturbing.

Another point-to-point thresholding technique is suggested in U.S. Pat. No. 5,111,310 and is based on the use of a "blue-noise mask". The blue-noise mask is a threshold array containing values that, when thresholded against pixel values, produces aperiodic halftone dot distributions that have a random, non-deterministic, non-white-noise character.

A method to calculate such a blue-noise mask is described in the specification of the cited patent, and is only summarized here. According to this method the mask is built "layer-by-layer", starting at the 50% level, for incrementally increasing and decreasing threshold layers. The 50% halftone dot layer is initially seeded with a 50% random distribution of binary halftone dots. A new dot distribution is obtained containing the desired blue-noise halftoning characteristics by first converting the 50% random distribution to the two dimensional Fourier domain, multiplying it with the characteristics of a blue-noise filter, and finally reconverting this result back to the spatial domain. The next layers "up" and "down" are obtained by selectively adding or removing additional halftone dots according to a criterion that at all levels minimizes the amount of energy in the lower part of the frequency spectrum. Because of the aperiodic character of the halftone dot distribution created by the blue-noise mask, subject moiré is successfully suppressed.

The large number of iterations necessary to convert back and forth between the "spatial" and "Fourier" domains make the calculation of a blue-noise mask extremely time-intensive. As a result, the method is only suitable for the use of relatively small masks (e.g. 128×128 threshold values). These small masks can be used on printers that have a relatively low resolution (e.g. 300 pixels per inch). When used at the higher resolutions common in the graphic arts (e.g. 1800 pixels per inch), an objectionable pattern shows up that reflects the repetition of the aperiodic dot distribution within the mask. The problem improves by using a blue-noise mask of a larger size, but this, as mentioned earlier, leads to undesirable calculation times. Furthermore the "tile repetition" patterns do not even then disappear completely, since the blue-noise method does not produce dot distributions that are sufficiently uniform to avoid visually-disturbing patterns.

In conclusion, the Bayer matrix produces periodic dot distributions that are still prone to the problems of subject moiré, while the aperiodic dot distributions produced by the blue-noise mask technique are not sufficiently uniform to eliminate objectionable mask repetition patterns.

It is accordingly a general object of the invention to provide an improved frequency-modulation halftone screen and method for frequency-modulation halftoning yielding desirable re-prographic characteristics with minimized artifacts attributable to the screening process.

It is a specific object of the invention to provide a halftone screen in which subject moiré is minimized.

It is a further specific object of the invention to provide a halftone screen in which unwanted patterns are eliminated.

It is a feature of the invention that the method can be accomplished with reasonable computation resources.

SUMMARY OF THE INVENTION

The invention is a frequency-modulation halftone screen and method for making a frequency-modulation halftone screen, utilizing local randomization of a deterministic screen. The deterministic screen optimizes uniformity of the halftone dot distribution, while the local randomization suppresses artifacts due to subject moiré. In summary, therefore, the invention can thus be described as a screen in which the uniformity of the halftone dots at a global scale is controlled deterministically to optimize the uniformity of the dot distribution, while, at a local scale, the dot distribution is randomized to reduce moiré.

BRIEF DESCRIPTION OF THE DRAWINGS

The invention will be best understood from a detailed description of a preferred embodiment thereof, selected for purposes of illustration, and presented with reference to the accompanying drawings, in which.

DETAILED DESCRIPTION OF A PREFERRED EMBODIMENT OF THE INVENTION

A method will now be described that produces frequency-modulation halftone screens having the desired characteristics, based on the use of a screening function In the first step of the method, a screening function is generated that produces halftone dot distributions of which the uniformity is optimal. Since, for a given halftone grid, the optimization of dot uniformity is a deterministic problem, a deterministic algorithm can be used to find such a screening function. In the case of a rectangular halftone grid, for example, the screening function found by this algorithm leads to the Bayer matrix (see the previously cited Bayer reference). For applications on imagesetters operated at 1800 dpi, a 512×512 Bayer matrix provides satisfactory results.

The second step in the method employs the local randomization of the deterministic screening function. This is done by permuting the positions of the deterministic screen function values over a distance that is "constraint-random", according to the following procedure. First the domain of the original deterministic screen function is subdivided into parcels each of the same size. Each of the parcels is again subdivided into a number of subparcels of the same size. The position of these subparcels is then permuted according to a random order. This provides the first "level" of the randomization. The process is carried out recursively on the subparcels, ending only when the level of the screen function elements themselves is reached.

Figure 1A:
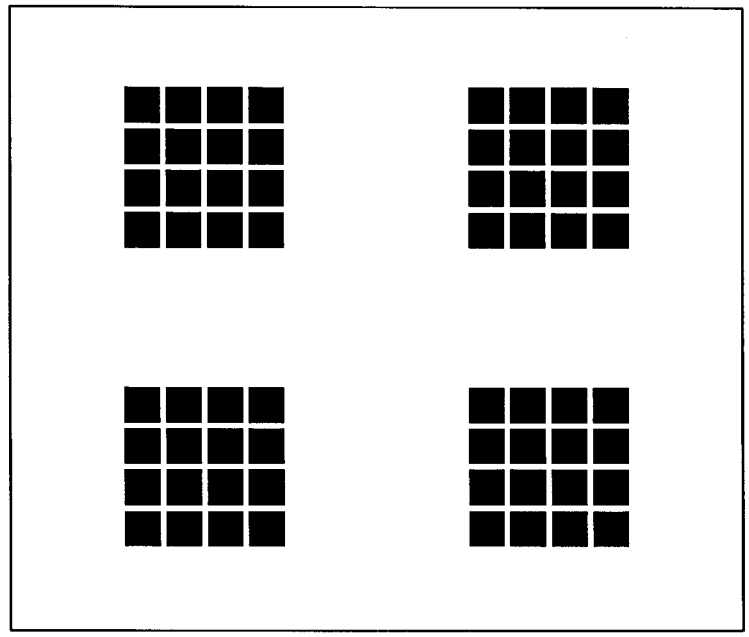
FIGS. 1A and 1B show halftone dot configurations in amplitude- and frequency-modulation halftone screening, respectively.
Figure 1B:
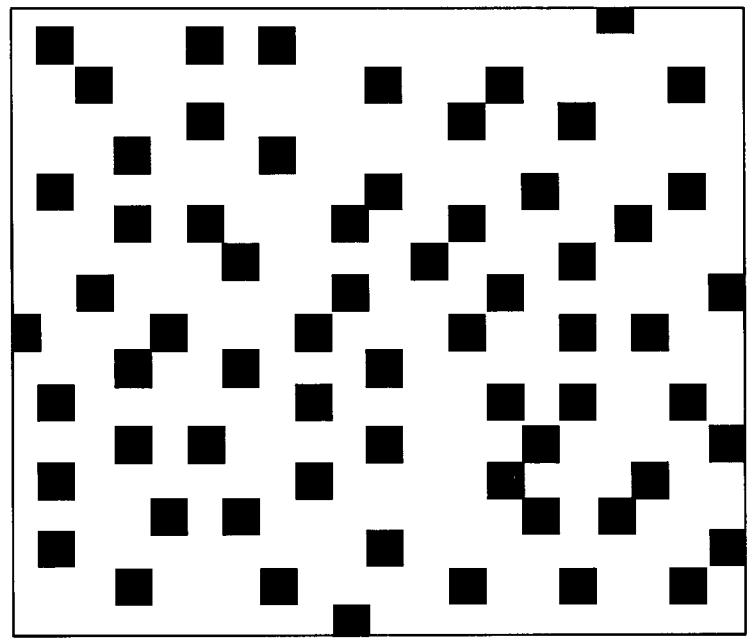
Figure 2:
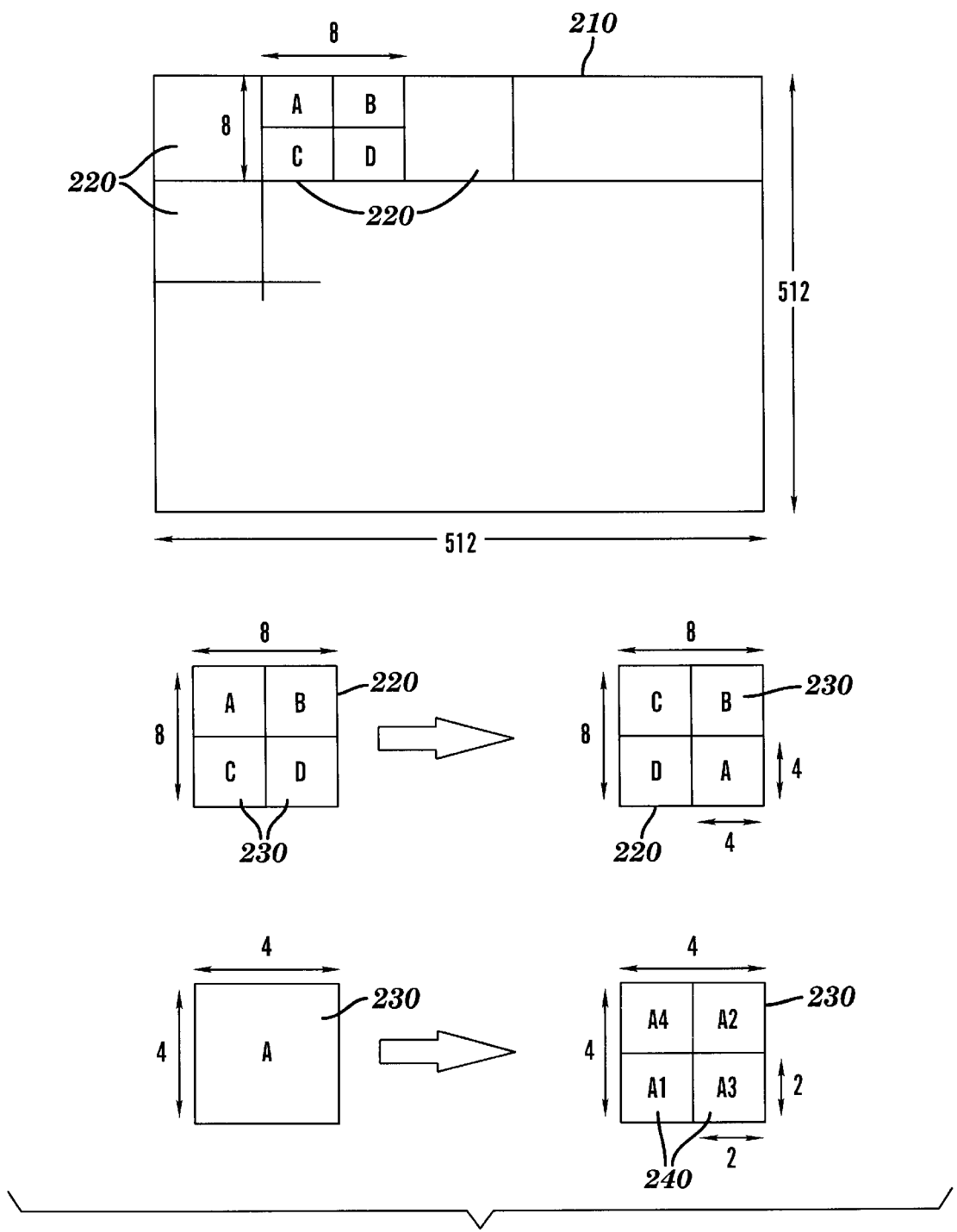
FIG. 2 illustrates the recursive technique used for local randomization of a frequency modulation screen; and, FIG. 3 is a system-level block diagram of the processing steps employed by the invention.

An example of the recusive randomization process is illustrated in FIG. 2 for the case of a 512×512 Bayer matrix. In this example, successful results are obtained by dividing the original matrix 210 into parcels 220 with a size of 8×8 screen function values. Every parcel 220 is then subdivided into subparcels 230 of 4×4 screen function values. The position of each 4×4 subparcel 230 within its 8×8 parcel 220 is then randomly permuted.. Each of the 4×4 subparcels 230 is then subdivided again into "sub-subparcels" 240 with a size of 2×2 screen function elements. Again, the position of each 2×2 sub-subparcel 240 is then randomly permuted within its 4×4 parcel 230. Finally, the order of the elemental screen function values within the 2×2 "sub-subparcels" 240 is randomized.

Figure 3:
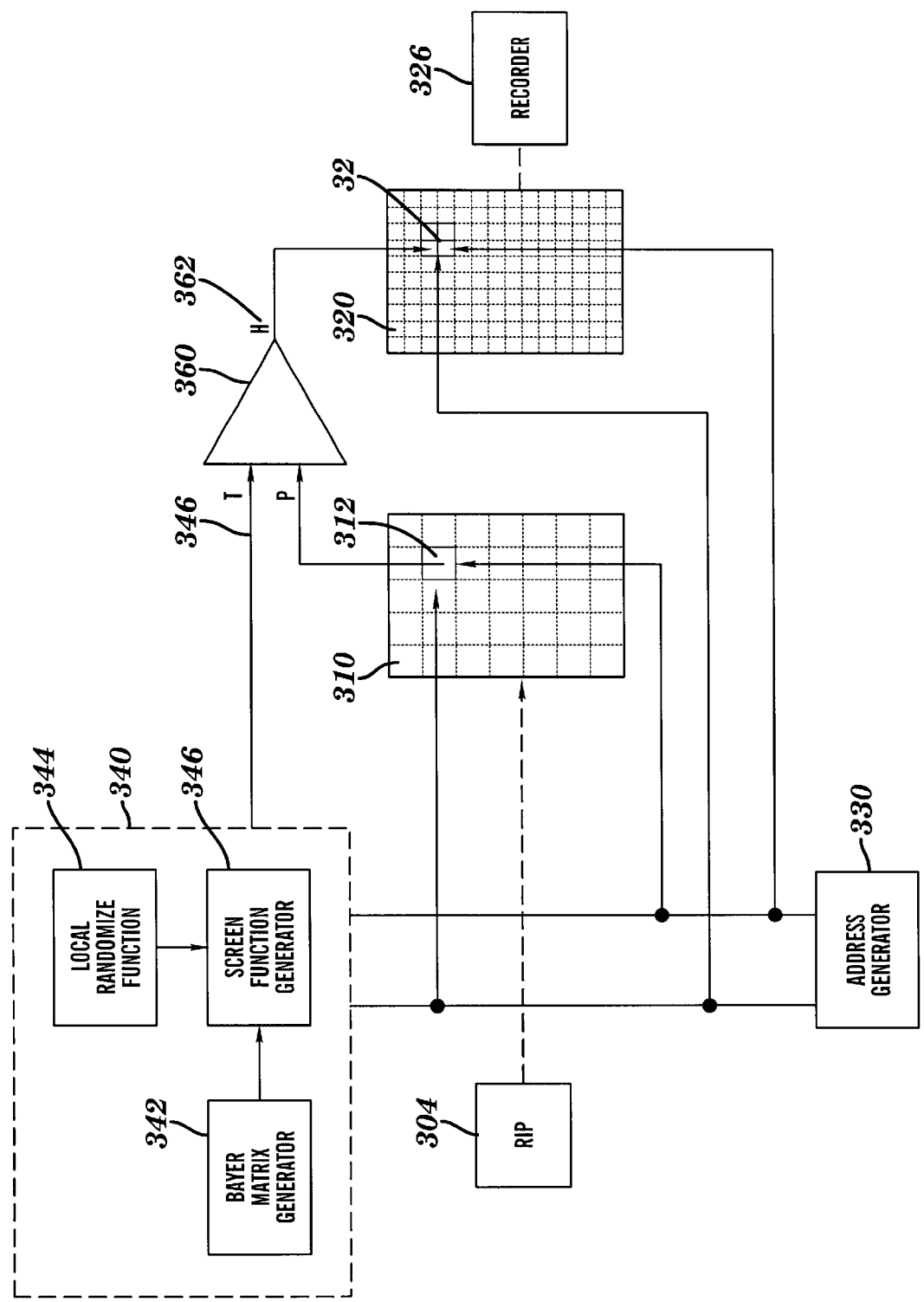

A circuit useful for performing the steps of the method is shown in FIG. 3. Block 310 is a memory store containing the original contone image data received from a raster image processor 304, organized as N by M rows and columns of pixel values. These values 312 are represented with 8 bits. Block 320 is another memory store, in which the halftoned pixel values 322 are stored for output to a recording device 326. The address generator 330 sequentially generates all the address values for the stores 310 and 320. Block 340 is a screen function generator module, containing within it a 512×512 Bayer matrix 342, together with the randomization module 344. Block 360 is a comparator, in which the screen function value T 346 produced by the screen function generator 340 is compared with a corresponding pixel value P 312 of the contone data store 310 to yield a halftone value H 362 which is 1 ("black") or 0 ("white") depending upon whether the P is greater than or less than T respectively.

The operation of the circuit of FIG. 3 is as follows. The address generator 330 generates in sequence the coordinates of all pixels 312 of the original contone image data store 310. For each such address value, the permuted screen function value 346 obtained by operation of the randomization technique described previously in module 344 with the original matrix 342 to produce the resultant threshold value T against which the pixel value P corresponding to the given address is compared in the comparator 360.

It will be clear to one skilled in the art that the method described in this preferred embodiment and illustrated in FIG. 2 and FIG. 3 can be implemented by alternative hardware and/or software components as well as analog methods such as optical screens. For example, the method is not limited to square grids, but can in addition be applied to rectangular, hexagonal, and non-periodic grids. The method can also be used for screens other than those obtained by comparing screen function values with pixel values as in the circuit of FIG. 3, e.g., for screens such as those obtained by selection from a predetermined set based upon pixel values (see for example WO 91,012,680).

In addition to use with bi-level recording devices, the method is also applicable to multilevel recording devices, including for example, contone recorders. For devices recording more than two values ("black" or "white"), the output of comparator 360 uses a set of possible output values instead of 1 or 0 as the value H resulting from the comparison of each pixel value P 312 and locally-randomized deterministic screen function value T 346.

A final example of an alternative implementation to that of FIG. 3 makes use of the features of the POSTSCRIPT language (a trademark of Adobe Systems, Inc.), by downloading pre-calculated screen descriptions as "threshold matrices" to a POSTSCRIPT RIP. As in the circuit of FIG. 3 the resultant locally-randomized deterministic screen function values T are effectively obtained using the method described previously for recursive randomization of a Bayer matrix. In stead of computation on the fly, however, the resultant locally-randomized deterministic screen function values are pre-computed thereby creating a new threshold matrix which is then downloaded for use in the comparison process.

Having described in detail preferred embodiments of our invention, it will now be apparent to those skilled in the art that numerous modifications can be made therein without departing from the scope of the invention as defined in the following claims.

What we claim is:

1. A frequency-modulation halftone screen having a plurality of halftone dots, said halftone dots being obtained by locally randomizing a deterministic frequency-modulation screen, said deterministic frequency-modulation screen for producing halftone dots with a fixed dot size and a distance between halftone dots, modulated according to tone level.

2. The frequency-modulation halftone screen of claim 1 wherein the halftone dots lie on a grid, wherein the grid is selected from the group consisting of a square grid, a rectangular grid, a hexagonal grid, and a non-periodic grid.

3. The frequency-modulation halftone screen of claim 1 wherein the halftone dots can take on more than two values.

4. The frequency-modulation halftone screen of claim 1 wherein the halftone dots can have more than one size.

5. A frequency-modulation halftone screen having a screen function that is a locally-randomized deterministic frequency-modulation screen function, said deterministic frequency-modulation screen function for producing halftone dots with a fixed dot size and a distance between halftone dots, modulated according to tone level.

6. The frequency-modulation halftone screen of claim 5 wherein the frequency-modulation screen function is a Bayer dither matrix.

7. The frequency-modulation halftone screen of claim 5 wherein the screen function values lie on a grid, wherein the grid is selected from the group consisting of a square grid, a rectangular grid, a hexagonal grid, and a non-periodic grid.

8. The frequency-modulation halftone screen of claim 5 wherein the screen function values can take on more than two values.

9. The frequency-modulation halftone screen of claim 5 wherein the screen function values can have more than one size.

10. A frequency-modulation halftone screen having a plurality of halftone dots and a locally-randomized frequency-modulation screen that produces at any tone level a maximum uniformity of the halftone dot distribution with the screen, wherein said halftone dots have a fixed dot size and have a distance between halftone dots, modulated according to tone level.

11. The frequency-modulation halftone screen of claim 10 wherein the halftone dots lie on a grid, wherein the grid is selected from the group consisting of a square grid, a rectangular grid, a hexagonal grid, and a non-periodic grid.

12. The frequency-modulation halftone screen of claim 10 wherein the halftone dots can take on more than two values.

13. The frequency-modulation halftone screen of claim 10 wherein the halftone dots can have more than one size.

14. A method for producing a frequency-modulation halftone screen comprising the steps of:
  (A) generating a deterministic frequency-modulation screen function for producing halftone dots with a fixed dot size and a distance between halftone dots, modulated according to tone level;
  (B) locally randomizing said deterministic frequency-modulation screen function; and,
  (C) utilizing said locally-randomized deterministic frequency-modulation screen function to produce the frequency-modulation halftone screen.

15. The method of claim 14 wherein the generated deterministic frequency-modulation screen function is a Bayer dither matrix.

16. The method of claim 14 wherein the local randomization of the deterministic frequency-modulation screen function is obtained by subdividing the frequency-modulation screen function into a plurality of parcels with each of said parcels having a plurality of screen function values, and then permuting the positions of said screen function values within each of said parcels.

17. The method of claim 14 wherein the local randomization comprises the following steps:
  (A) subdividing the deterministic frequency-modulation screen function into a plurality of parcels each having a plurality of screen function values;
  (B) subdividing each of said plurality of parcels into subparcels;
  (C) randomly permuting the positions of said subparcels within said parcels; and,
  (D) repeating steps (B) and (C) recursively for each subparcel until a subparcel comprises only a single screen function element.

18. The method of claim 14 wherein the screen function values can take on more than two values.

19. (Amended) The method of claim 14 wherein the screen function values lie on a grid, wherein the grid is selected from the group consisting of a square grid, a rectangular grid, a hexagonal grid, and a non-periodic grid.

20. The method of claim 14 wherein the screen function values can have more than one size.

21. A method for producing a frequency-modulation halftone screen comprising the steps of:

(A) generating a deterministic frequency-modulation screen for producing halftone dots with a fixed dot size and a distance between halftone dots, modulated according to tone level;
  (B) locally randomizing said deterministic frequency-modulation screen; and,
  (C) utilizing said locally-randomized deterministic frequency-modulation screen to produce the frequency-modulation halftone screen.

22. The method of claim 21 wherein the generated deterministic frequency-modulation screen is obtained from a Bayer dither matrix.

23. The method of claim 21 wherein the local randomization of the deterministic frequency-modulation screen is obtained by subdividing the frequency-modulation screen into a plurality of parcels with each of said parcels having a plurality of halftone dots, and then permuting the positions of said halftone dots within each of said parcels.

24. The method of claim 21 wherein the local randomization comprises the following steps:
  (A) subdividing the deterministic frequency-modulation screen into a plurality of parcels each having a plurality of halftone dots;
  (B) subdividing each of said plurality of parcels into subparcels;
  (C) randomly permuting the positions of said subparcels within said parcels; and,
  (D) repeating steps (B) and (C) recursively for each subparcel until a subparcel comprises only a halftone dot.

25. A frequency-modulation halftone screen having a plurality of halftone dots lying on a grid, said halftone dots being obtained by locally randomizing a deterministic frequency-modulation screen, wherein the grid is selected from the group consisting of a square grid, a rectangular grid, a hexagonal grid, and a non-periodic grid.

26. A frequency-modulation halftone screen having a plurality of halftone dots which can take on more than two values, said halftone dots being obtained by locally randomizing a deterministic frequency-modulation screen.

27. A frequency-modulation halftone screen having a plurality of halftone dots which can have more than one size, said halftone dots being obtained by locally randomizing a deterministic frequency-modulation screen.

28. A frequency-modulation halftone screen having a screen function that is a locally-randomized deterministic frequency-modulation screen function, wherein the screen function is a Bayer dither matrix.

29. A frequency-modulation halftone screen having a screen function that is a locally-randomized deterministic frequency-modulation screen function, the screen function having values which lie on a grid, wherein the grid is selected from the group consisting of a square grid, a rectangular grid, a hexagonal grid, and a non-periodic grid.

30. A method for producing a frequency-modulation halftone screen comprising the steps of:
  (A) generating a deterministic frequency-modulation screen function, wherein the screen function is a Bayer dither matrix;
  (B) locally randomizing said deterministic frequency-modulation screen function; and,
  (C) utilizing said locally-randomized deterministic frequency-modulation screen function to produce the frequency-modulation halftone screen.

* * * * *

UNITED STATES PATENT AND TRADEMARK OFFICE
CERTIFICATE OF CORRECTION

PATENT NO. : 6,515,768 B1
DATED : February 4, 2003
INVENTOR(S) : Deschuytere et al.

It is certified that error appears in the above-identified patent and that said Letters Patent is hereby corrected as shown below:

<u>Title page, Item [54] and Column 1, line 1,</u>
Please delete "HALFSTONE" and insert -- HALFTONE --.

Signed and Sealed this

Twentieth Day of May, 2003

JAMES E. ROGAN
*Director of the United States Patent and Trademark Office*